Figure 7:
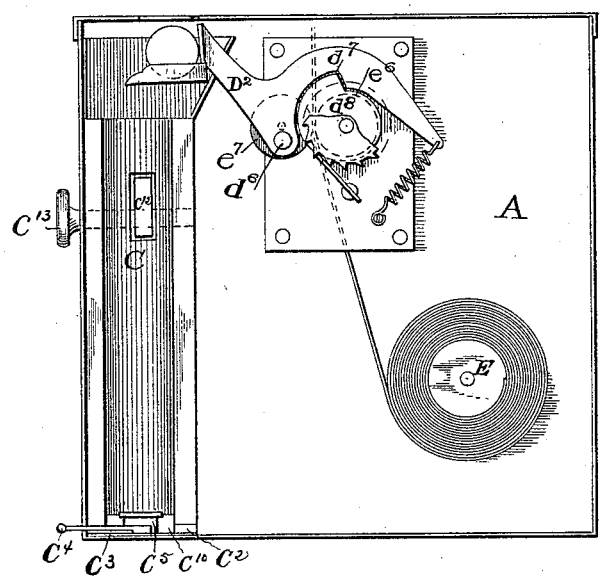

(No Model.) 3 Sheets—Sheet 1.
J. S. BARCUS.
COIN CONTROLLED APPARATUS FOR ADVERTISING AND EDUCATIONAL SYSTEMS.
No. 538,494. Patented Apr. 30, 1895.
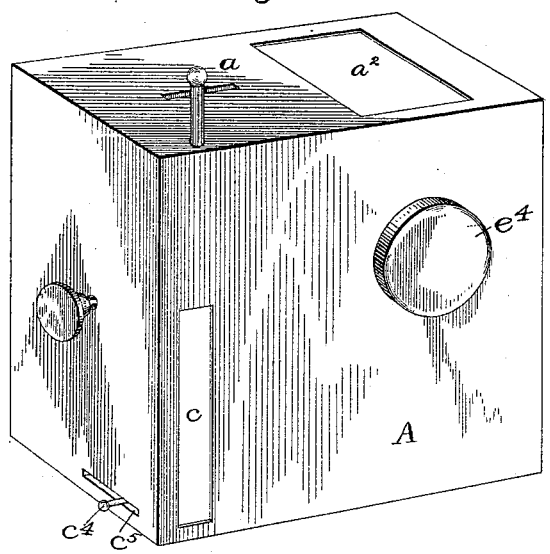
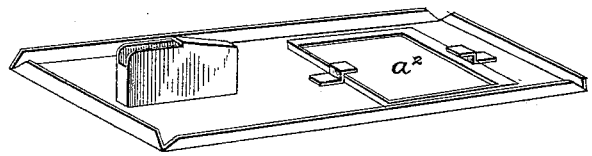
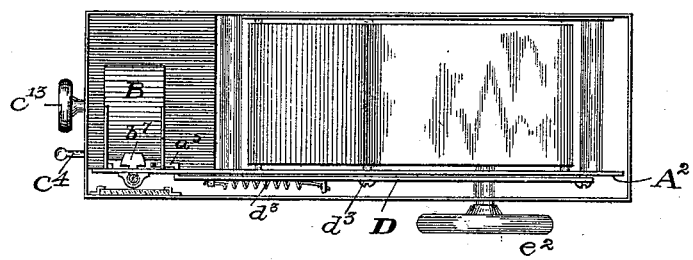
Fig. 2.
WITNESSES
Alvan Macauley.
E H Parry
Inventor
J. S. Barcus,
by A. J. Dyrenforth,
his Attorney

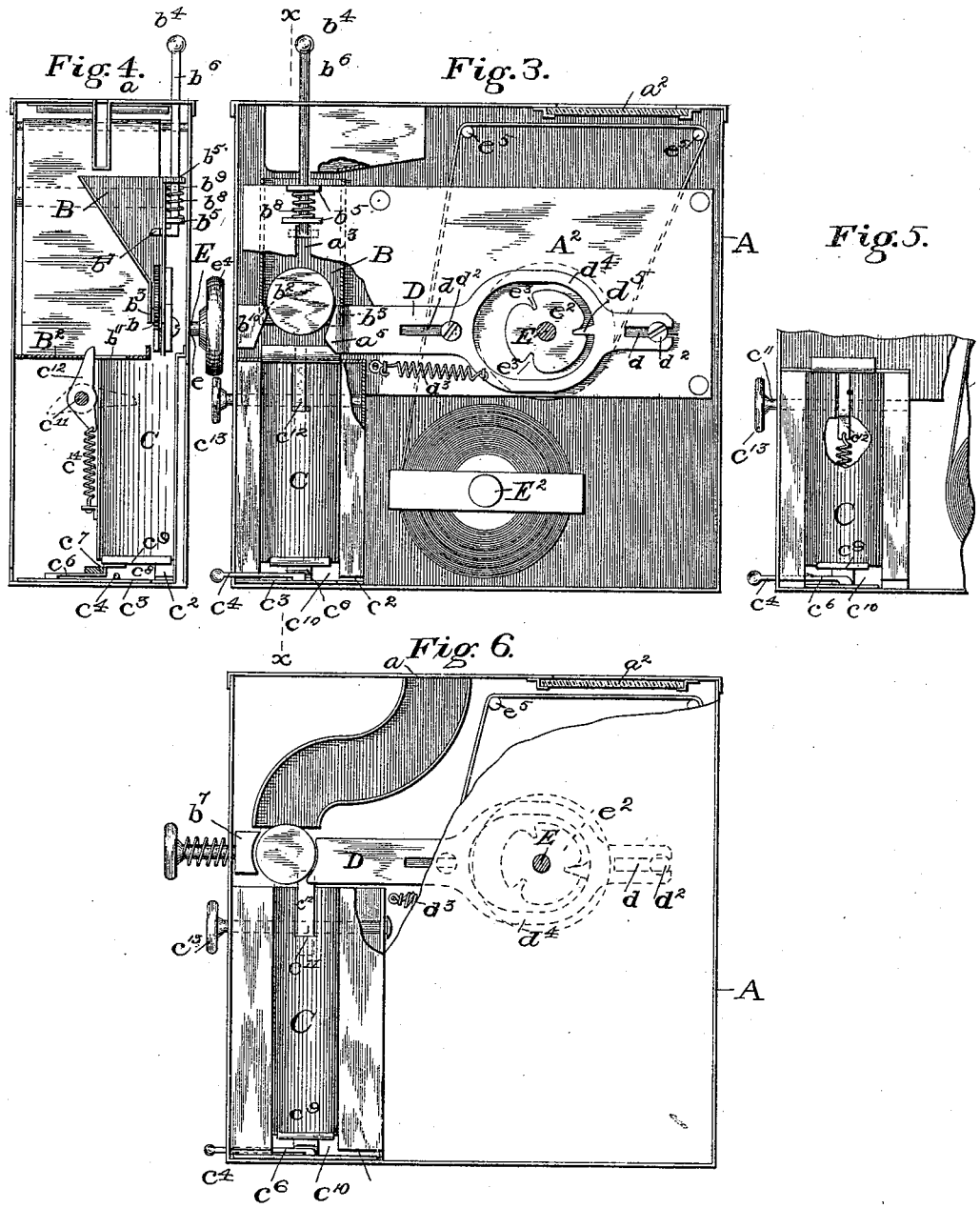

(No Model.) 3 Sheets—Sheet 3.
J. S. BARCUS.
COIN CONTROLLED APPARATUS FOR ADVERTISING AND EDUCATIONAL SYSTEMS.

No. 538,494. Patented Apr. 30, 1895.

WITNESSES
Alvan Macauley
T. Parry

Inventor
J. S. Barcus,
by R. S. Dyrenforth,
his Attorney

UNITED STATES PATENT OFFICE.

JAMES S. BARCUS, OF CHICAGO, ILLINOIS.

COIN-CONTROLLED APPARATUS FOR ADVERTISING AND EDUCATIONAL SYSTEMS.

SPECIFICATION forming part of Letters Patent No. 538,494, dated April 30, 1895.

Application filed November 30, 1894. Serial No. 530,440. (No model.)

*To all whom it may concern:*

Be it known that I, JAMES S. BARCUS, a citizen of the United States, residing at Chicago, in the county of Cook and State of Illinois, have invented certain new and useful Improvements in Advertising and Educational Systems by Coin-Controlled Apparatus; and I do hereby declare the following to be a full, clear, and exact description of the invention, such as will enable others skilled in the art to which it appertains to make and use the same.

This invention relates to advertising and educational systems by coin-controlled apparatus.

The object of the invention is to present an attractive method by which, in connection with certain apparatus, particularly, a novel kind of coin-controlled apparatus of my invention, a habit of systematic and methodical investigation and acquisition of knowledge may be cultivated by and together with regular collection and saving of money; that is to say, a person to gain particular knowledge or to place himself in line to acquire a piece of information for periodical storing away in his mind has only to pay himself,—the sum acquired from many such storings then to be withdrawn for application to some particular, or to any desired purpose; or money may be stored up to certain installments induced by presentation of an object or of objects for the insertion or insertions.

The object is, furthermore, by the method employed, to advertise some particular business, or purpose.

The invention consists in the combination with a locked coin-receptacle, from which the coin can only be removed after the accumulation in it of a certain installment of money, of a device inducive of the accumulation, or presenting matter as the result of the insertion of coin.

The invention may be carried into effect in many different ways; but I prefer to carry it into effect by means of apparatus to be operated by the insertion of money, which is then held as in bank, though not subject to withdrawal until, perhaps, a certain sum is collected, the apparatus, upon the insertion of the money, then displaying or being placed in condition to make display possible, of some substance, object, or piece of information, some question to be answered, some proverb, some maxim, witticism, or other attractive and useful matter. In this connection and in connection with other uses of the device, advertisements may be placed in such shape as to come to view when the coin is dropped in.

Another use to which the invention may be applied is that of collection of money for payments on the installment plan, as for goods delivered. This is pleasantly and instructively applicable in payment for books in installments.

In the accompanying drawings I have illustrated novel apparatus, in various forms, by which my invention may be carried into effect.

Figure 8:
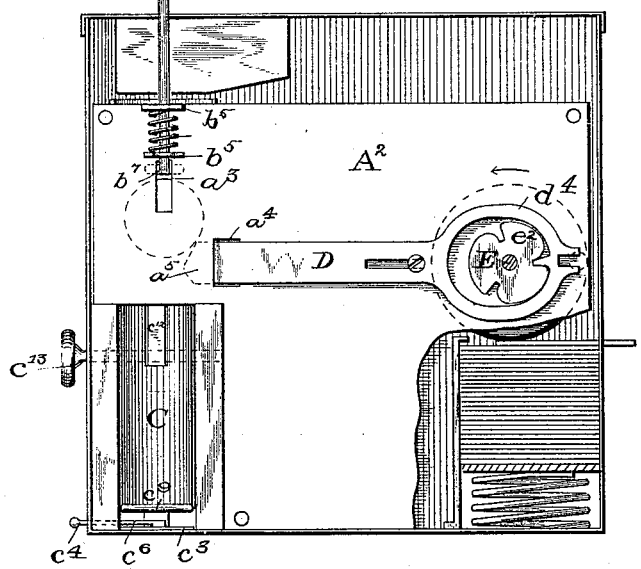

In the drawings, which are in the nature of mere examples, Figure 1 is a view in perspective displaying the exterior of a casing of a coin-controlled apparatus embodying the essential features of my invention. Fig. 2 is a view displaying in plan the casing and a portion of its contained mechanism and in inverted perspective the cover or lid detached from the casing. Fig. 3 is a view in front elevation, partly in section, with the front side of the casing removed, displaying the internal mechanism of the apparatus. Fig. 4 is a view in vertical cross-section, taken on the line $x$ $x$, Fig. 3, showing more clearly the connection between the coin chute and the coin-receptacle and also the push-rod or plunger for forcing the coins from the chute to a position to be deposited within the receptacle. Fig. 5 is a view in vertical cross-section through the coin-receptacle, showing more clearly the connection between the coin-depressing arm and its retracting-spring. Fig. 6 is a view in front elevation, a portion of the front of the casing being broken away, showing a modified form of apparatus, the plunger in this instance being located at the side instead of at the top of the casing. Fig. 7 is a similar view to Fig. 6, showing a further modification of apparatus, the plunger in this instance being omitted and a spring-retracted lever operated by the weight of a coin being employed. Fig. 8 is a similar view to Figs. 6 and 7, showing a still further modification of the apparatus, the web of paper shown in the other figures being omitted and a receptacle containing a number of cards or disks bearing information being employed in lieu thereof.

In the drawings, A indicates the casing of the bank of metal or other suitable substance, having, in its top, a longitudinal slit, $a$, for the insertion of an appropriate coin, and a transverse or other opening, $a^2$, provided with glass or other transparent substance. Within the casing, toward one end, preferably not far from the slit, and fixed to the inner side of an inner plate or wall, $A^2$, having a vertical slot, $a^3$, and an opening, $a^4$, see Fig. 8, is a hopper, B, having its front vertical, the same being a portion of the inner face of the plate $A^2$ its back inclined downward toward the plate, a longitudinal opening, $b$, in its bottom, and short vertical slits, $b^2$, $b^3$, at its sides, in the bottom upward. Below the hopper, is a transverse partition, $B^2$, and beneath the partition, directly under the hopper, is a coin-receptacle, C, of tubular or other appropriate shape. Upon the outside of the plate, $A^2$, at the hopper, is a push-rod or plunger, $b^4$, which is held and free to slide vertically in guide-eyes $b^5$, $b^5$, fixed to the plate. The plunger consists of a rod, $b^6$, having, at its lower end, a suitable head, $b^7$, and provided around its body, between the guide eyes, with a coil-spring, $b^8$, borne against by a cross-pin, $b^9$, through the rod, by which, also, the rod is held from slipping down. Fixed to and projecting from the end of the casing, into the vertical slit, $b^2$, at the lower end of the hopper, is a stop or abutment, $b^{10}$, having the upper part of its inner edge inclining downward toward the center of the hopper and the lower part of its inner edge inclining downward away from the center of the hopper, or toward its end of the casing.

Between the position of the hopper at the one end and the other end of the casing, there is attached to the outside of the plate, $A^2$, in a manner free to slide longitudinally and horizontally, a locking and releasing device, such as a latch, D. This attachment to the plate is through slots, $d$, $d$, in the latch by headed pins or screws, $d^2$, $d^2$, passing through them into the plate, $A^2$. The latch is normally drawn toward the hopper by a spring, $d^3$, and at the end near the hopper, is given an offset, $a^5$, inward, so that the remainder extending beyond the offset, is on an inner plane parallel with the body of the latch. The upper part of the end or edge near the hopper is inclined downward toward the center thereof. The offset passes through the opening $a^4$, and the extension or end, on a different plane but parallel with the body of the latch, slides against the inner face of the plate, $A^2$, and projects into the hopper through the slit, $b^3$. In the course of its length, between the slots, the latch has an open enlargement or yoke, $d^4$, and into one end of this yoke, in the direction of the pull of the spring, that is to say, toward the hopper, projects a pin, $d^5$, to act as a detent, as will presently appear.

Within the casing, transversely of the same, free to turn and directly under the position of the glazed opening in the top, is a shaft or roller, E, the outer journal of which $e$, projects outward through the plate, $A^2$, at the situation of the opening in the enlargement of the latch; and, fixed upon this journal, against the outside of the plate, $A^2$, and so within the yoke, is a wheel, $e^2$, having a series of radial notches, $e^3$, from the periphery inward, into which the pin, $d^5$, from the latch takes, and the periphery between any two notches being a curved or cam face rising partly or wholly in the direction in which the shaft or roller turns. When the front side of the casing is in place, the end of the journal will also project through this, and a suitable device for turning the shaft from without, such as the milled wheel, $e^4$, will then be screwed on or otherwise fixed to it. Now, so long as the pin of the yoke is in one of the notches of the cam-wheel, the shaft or roller cannot be turned; and the latch is to be retracted against the spring, withdrawing the pin from a notch to allow the cam-wheel to move, and, with it, the shaft on which it is fixed to turn. Also within the casing, but below the roller, E, is another roller, $E^2$, and this roller has wound upon it a supply of paper or fabric in a continuous web. From this roller, the web passes over guides, $e^5$, under the opening, $a^2$, in the top of the casing, to the roller, E, upon which it is wound upon the turning of the same. The roller, E, is, then, in effect, a take-up roll and the roller, $E^2$, a feed-roll. The web is to bear, transversely, on its exterior surface, a series of expressions or other matter in writing, print, or other impression, the expressions being at such distances apart that the turning of the cam wheel from one notch at the pin will bring another notch to the pin, or expose the next in the series.

As a coin of suitable size is dropped through the slit, $a$, into the hopper, B, it falls on edge into the longitudinal slit, $b$, in the bottom of the hopper, lodging, at one part of its rim, laterally, against the inclined edge of the stop or abutment, $b^{10}$, and, at the opposite part of its rim, against the inclined edge of the end of the latch. As the coin thus rests in the slit between the stop and the latch, it will be flat against the front wall of the hopper and directly under the plunger. Upon, now, depressing the plunger, the coin will be forced downward between the stop and the latch, moving the latch against the pull of its spring until the pin is just out of a notch in the cam-wheel and even with the lower inclined portion of a cam-face on its rim; the parts being so proportioned and the extent of movement of the plunger being such that, given its farthest movement inward, the coin will move the latch to the extent of withdrawing the pin from a notch, while, at the same time, the coin will still be held, though lower down, between the stop or abutment and the latch. The pin being now released, the cam-wheel may be turned, and as the pin is then even with the cam-face, upon turning the cam-wheel, the pin rides upon the cam, pulling the latch farther away from the stop and extending the space between the stop and the end of the latch, until the coin falls through into the coin-receptacle, C. This occurs when about the highest portion of the rising cam-face has been brought into contact with the pin, and, thereafter, upon turning the cam-wheel farther, the pin falls into the next notch, the latch is retracted, and the wheel cannot again be turned until the pin is again withdrawn from a notch by movement of the latch, by insertion of a coin.

In order that the coins falling into the coin-receptacle may always take position upon their sides, that is to say, lie flat therein, it is necessary that the receptacle should not be so large in cross diameter as to permit a coin to lodge on edge between the walls and other coins lying flat. The coins will be received into this receptacle until the same is full, or until a predetermined sum has been accumulated. The point, then, will be to withdraw the amount; and, it being desirable that it shall not be possible to remove the coins without destruction of or injury to the apparatus, until the receptacle is full, or until a certain desired sum has been accumulated, which may be recognized from a sight-opening, $c$, properly provided with glass or other transparent substance, the coins, then, in requisite number, are made means, in part, of their removal.

In the bottom of the casing, at the coin-receptacle, is an opening, $c^2$. Upon the bottom of the casing, within, below the coin receptacle, and free to slide forward and backward, over and off the opening, is a plate, $c^3$ having a short bar, $c^4$, extending from the sides of the slide, out through a horizontal slot, $c^5$, in the end of the casing. Fixed upon the upper face of the slide, and extending free from the back forward, is a spring, $c^6$, bent upward at a right-angle forming an offset, $c^7$, which may be reinforced as shown, and then horizontally forward at $c^8$. Upon this last part of the spring, which is higher than the rest and capable of being pressed down and of springing back, is a disk, $c^9$. This disk will then be immediately over that portion of the slide that forms the bottom of the receptacle when the opening is closed and is of about the size and shape of the coin-receptacle, forming a false bottom thereto. It will be observed that the wall of the coin-receptacle at the back and sides does not extend to the bottom of the casing, so that a horizontal cut, $c^{10}$, through these walls is left. When the slide covers the bottom, the disk will be projecting upward into the coin-receptacle, forming a false bottom, as before said, and the rear of the disk will present a shoulder, preventing the slide from being pulled from over the opening in the bottom; so that unless the disk can be depressed to lower the end of the spring within the receptacle, and, with it, the shoulder, to allow it to pass under the cut, the bottom cannot be opened.

At the top of the coin-receptacle, just to the rear thereof, lying longitudinally of the casing, is a rod, $c^{11}$, journaled in the end of the casing and in a short vertical partition within and extending downward from the transverse partition, $B^2$. This rod has fixed upon it, at a position in its length, about central of the rear of the coin-receptacle, a rigid arm, $c^{12}$, and is provided with a suitable knob or milled wheel, $c^{13}$, to operate it. At the top and about centrally, the coin-receptacle has a vertical incut of the width of this arm and extending downward a sufficient distance to permit of the arm being rocked to a position to contact with the coins in the receptacle and about centrally, over the arm, the partition, $B^2$, has a horizontal cut, $b^{11}$. The arm is provided with a spiral spring, $c^{14}$, having one end fixed to its back or lower portion, and the other to any portion of the apparatus, as to the rear outside of the coin-receptacle, and so arranged with reference to the arm that it will, normally, be in a vertical position at the rear outside of the coin-receptacle, with its lower portion taking against the rear of the coin-receptacle, which then acts as a stop thereto. When, now, coins have been dropped into the receptacle, so that the surface of the top one will be somewhat above the bottom of the vertical cut in the upper part of the receptacle, the rod may be turned, forcing the upper part of the arm down upon the coins and thus depressing the disk, whereupon the bottom may be slid by the bar to open the receptacle.

The object, as stated above, of stopping the movement of the roller, at intervals, by the device which may be called a latch-lock, is, that the matter upon the web of fabric or paper may not be read, or knowledge of such matter be gained, until a coin shall have been inserted into the apparatus; but, if the slit through which the coin is to be inserted should be directly over the hopper, the latch might be moved to permit turning of the roll, without insertion of a coin by the insertion of a blade or the movement of the latch by a wire. To guard against this, the slit is not placed directly over the hopper, and the same is provided with a chute, which opens at its lower end over the hopper. Instead of this chute being in the form shown in Figs. 2, 3 and 4, of the drawings, it may be in the form of an ogee curve, as shown in Fig. 6; and, instead of the plunger being set vertically, as shown in Figs. 2, 3 and 4, it may be set horizontally, as shown in Fig. 6. Hereby, also, the hopper is dispensed with. Furthermore, as shown in this figure, and, by preference, the inner wall or plate $A^2$ may be dispensed with and the latch-lock device be set directly on the inner face of the front of the casing.

Instead of exposing the web to view under the opening into the top of the cover and then winding it on a take-up roll, the same may be passed between draw-rolls, $e^6$, $e^7$, and be fed out through the top of the casing, as shown in Fig. 7. In this figure, the roll, $e^6$, is restrained from turning backward by a pawl and ratchet device, and, instead of the yoke-latch of the other figures, there is a rocking-latch or spring-lever, $D^2$, pivoted at $d^6$, and, having at its under side, a notch, $d^7$, taking upon and holding a snail, $d^8$, fixed to the roll, against turning, until the lever is raised against the spring by depression of the end opposite the spring, as by pressure from or the weight of a coin, all as shown, false or surreptitious depression to be properly guarded against. Finally, instead of the rollers and the web, there may be a ticket-receptacle having a spring-follower bottom, at the end of the casing opposite the location of the coin-receptacle, and a suitable feed-wheel just above, there being an opening at the top of the ticket-receptacle laterally outward through the end of the casing, all as shown in Fig. 8, whereby, when there are tickets in the receptacle, these will be pushed upward against the feed-wheel by the spring-follower, upon turning the wheel, as indicated, and upon release of the cam-wheel by insertion of a coin, as before, a ticket will be fed out through the opening in the end; but the slot may be at the lower part of the box, and the tickets can be pressed down against the feed-wheel, located below, by weight.

Having thus described my invention, what I claim, and desire to secure by Letters Patent, is—

1. In a coin-controlled apparatus, the combination of a locking and releasing device, a feeding or supply device which is held against movement until the locking and releasing device is moved by the pressure of a coin while passing by the same, means for forcing the coin against the locking and releasing device, means for operating the feeding or supply device after its release, and mechanism operating automatically to re-lock the locking and releasing device, substantially as described.

2. In a coin-controlled apparatus, the combination of a locking and releasing device, a feeding or supply device which is held against movement by a detent until the locking and releasing device is initially moved by the passage of a coin into the apparatus, and means for giving the locking and releasing device a further movement than that given it by the coin, thereby to remove the detent free of the feeding or supply device to permit of its operation, substantially as described.

3. In a coin-controlled apparatus, the combination of a latch, a roller held against rotation by a detent until the latch is initially moved by the passage of a coin entering the apparatus, a coin-receptacle having its upper end normally closed by the latch, and means for giving the latch a further movement than that given it by the coin, thereby to release the roller and at the same time deposit the coin within the receptacle, substantially as described.

4. In a coin-controlled apparatus, the combination with a device for directing the coin to its operative position, of a plunger for pressing the coin downward, a latch moved by the coin in this act, a roller restrained against turning by a detent on the latch before the same is moved, and a cam by which the latch is given a further movement than that given it by the coin, substantially as described.

5. In a coin-controlled apparatus, the combination with a device for directing a coin to its operative position, of a plunger for pressing the coin downward, a latch moved by the coin in this act, a roller restrained against turning by a detent on the latch before the same is moved, a cam by which the latch is given a further movement than that given it by the coin, and a receptacle for receiving the coin when dropped by the plunger, substantially as described.

6. In a coin-controlled apparatus, the combination with a device for directing the coin to its operative position, of a plunger for pressing the coin downward, a latch moved by the coin in this act, a roller restrained against turning by a detent on the latch, before the same is moved, a cam by which the latch is given a further movement than that given it it by the coin, and a device by which printed, written, or other matter is brought into view upon turning of a roller, substantially as described.

7. In a coin-controlled apparatus, the combination with the closed coin-receptacle having an open bottom, and a cut in its wall at its lower end, of a slide bearing a spring provided with a disk, the slide covering the opening only when in position in the receptacle, and the disk taking against the cut and preventing the bottom being opened until the spring is depressed.

8. In a coin-controlled apparatus, the combination with the coin-receptacle having an open bottom, of the slide, the spring, the spring-retracted rod and arm for pressing the coin downward upon the spring and releasing the slide so that the same can be opened after the requisite amount of coin has been placed in the receptacle, substantially as set forth.

9. A coin-receptacle having a bottom capable of vertical and lateral movement, means for pressing the bottom upward into the receptacle, and independent means for depressing the bottom through the medium of the interposed coins, substantially as described.

In testimony whereof I affix my signature in presence of two witnesses.

JAMES S. BARCUS.

Witnesses:
R. G. DYRENFORTH,
E. H. PARRY.